US012354440B2

(12) United States Patent
Nelson et al.

(10) Patent No.: US 12,354,440 B2
(45) Date of Patent: Jul. 8, 2025

(54) AUTOMATED PROGRESSIVE POOL MANAGEMENT FOR GAMING

(71) Applicant: IGT, Las Vegas, NV (US)

(72) Inventors: Dwayne Nelson, Las Vegas, NV (US); Kevin Higgins, Reno, NV (US); Christopher Levin, Reno, NV (US)

(73) Assignee: IGT, Las Vegas, NV (US)

( * ) Notice: Subject to any disclaimer, the term of this patent is extended or adjusted under 35 U.S.C. 154(b) by 320 days.

(21) Appl. No.: 17/888,122

(22) Filed: Aug. 15, 2022

(65) Prior Publication Data

US 2024/0054858 A1 Feb. 15, 2024

(51) Int. Cl.
*G07F 17/32* (2006.01)

(52) U.S. Cl.
CPC ................................ *G07F 17/3258* (2013.01)

(58) Field of Classification Search
None
See application file for complete search history.

(56) References Cited

U.S. PATENT DOCUMENTS

2011/0275425 A1* 11/2011 Asher ................. G07F 17/3258 463/6
2013/0310165 A1* 11/2013 Witty .................. G07F 17/3244 463/27
2016/0055718 A1* 2/2016 Lyons ................ G07F 17/3258 463/27

* cited by examiner

*Primary Examiner* — Jason T Yen
(74) *Attorney, Agent, or Firm* — Sage Patent Group

(57) ABSTRACT

A system configured to manage progressive pools can include a processor circuit and a memory coupled to the processor circuit. The memory includes machine-readable instructions that, when executed by the processor circuit, cause the system to perform operations. The operations include determining to cease operation of a first progressive game on a first electronic gaming machines ("EGM"). The first progressive game can be associated with a first progressive pool. The operations can further include, allocating a portion of the first progressive pool to a second progressive pool associated with a second progressive game based on a characteristic of the first progressive game and a characteristic of the second progressive game. The operations further include, responsive to determining to cease operation of the first progressive game, transmitting a message to the first EGM, the message including instructions to cease operation of the first progressive game.

20 Claims, 8 Drawing Sheets

AUTOMATED PROGRESSIVE POOL MANAGEMENT FOR GAMING

BACKGROUND

Embodiments described herein relate to electronic gaming machines (EGMs), and in particular to modifying operation of a game provided by EGMs, and related systems, devices, and methods. In some examples, a progressive award (e.g., a jackpot) is available to a player of an EGM. A value of the progressive award can be increased by a portion of each wager made on the EGM. In additional or alternative examples, EGMs in a gaming environment, such as a casino environment, may have a linked (or shared) progressive award that is increased by a portion of each wager made on one of the qualifying EGMs. Once a user triggers a gameplay event on one of the qualifying EGMs, the progressive award can be provided to the user and the progressive award can be reduced to a predetermined amount (e.g., zero).

SUMMARY

According to some embodiments, a system configured to manage progressive pools is provided. The system includes a processor circuit and a memory coupled to the processor circuit. The memory includes machine-readable instructions that, when executed by the processor circuit, cause the system to perform operations. The operations include determining to cease operation of a first progressive game on a first electronic gaming machines ("EGM"). The first progressive game is associated with a first progressive pool. The operations further include, responsive to determining to cease operation of the first progressive game, allocating a portion of the first progressive pool to a second progressive pool associated with a second progressive game based on a characteristic of the first progressive game and a characteristic of the second progressive game. The operations further include, responsive to determining to cease operation of the first progressive game, transmitting a message to the first EGM. The message includes instructions to cease operation of the first progressive game.

According to other embodiments, a method performed by a device of managing a first progressive pool is provided. The first progressive pool is associated with a progressive game provided by one or more electronic gaming machines ("EGMs"). The method includes determining a triggering event associated with the progressive game has occurred. The method further includes determining a value of the first progressive pool. The method further includes allocating the first progressive pool to a second progressive pool associated with one or more activities.

According to other embodiments, a device configured to manage progressive pools is provided. The device includes a processor circuit and a memory coupled to the processor circuit. The memory includes machine-readable instructions that, when executed by the processor circuit, cause the device to perform operations. The operations include determining to cease operation of a first progressive game on a set of electronic gaming machines ("EGMs"). The first progressive game is associated with a first progressive pool. The operations further include, responsive to determining to cease operation of the first progressive game, allocating a portion of the first progressive pool to a second progressive pool associated with a second progressive game based on a characteristic of the first progressive game and a characteristic of the second progressive game.

According to various embodiments, EGMs, systems, methods, and non-transitory computer-readable medium are provided for performing the above embodiments.

DETAILED DESCRIPTION

Progressive awards can attract players by offering the opportunity for a bigger than normal prize. However, regulations associated with managing progressive pools (e.g., progressive awards prior to being won) can limit the ability of an EGM operator from modifying a progressive game associated with the progressive pool.

Embodiments described herein relate to maintaining an infrastructure required to provide a progressive game. In some embodiments, a system automatically manages progressive games and their associated progressive pools. In additional or alternative embodiments, the system automates accounting and meeting regulatory requirements that arise when installing and/or modifying a progressive game associated with a progressive pool. In some examples, the system provides a more continuous and fresh player experience by allowing progressive games to be quickly modified without EGM downtime.

Figure 1:
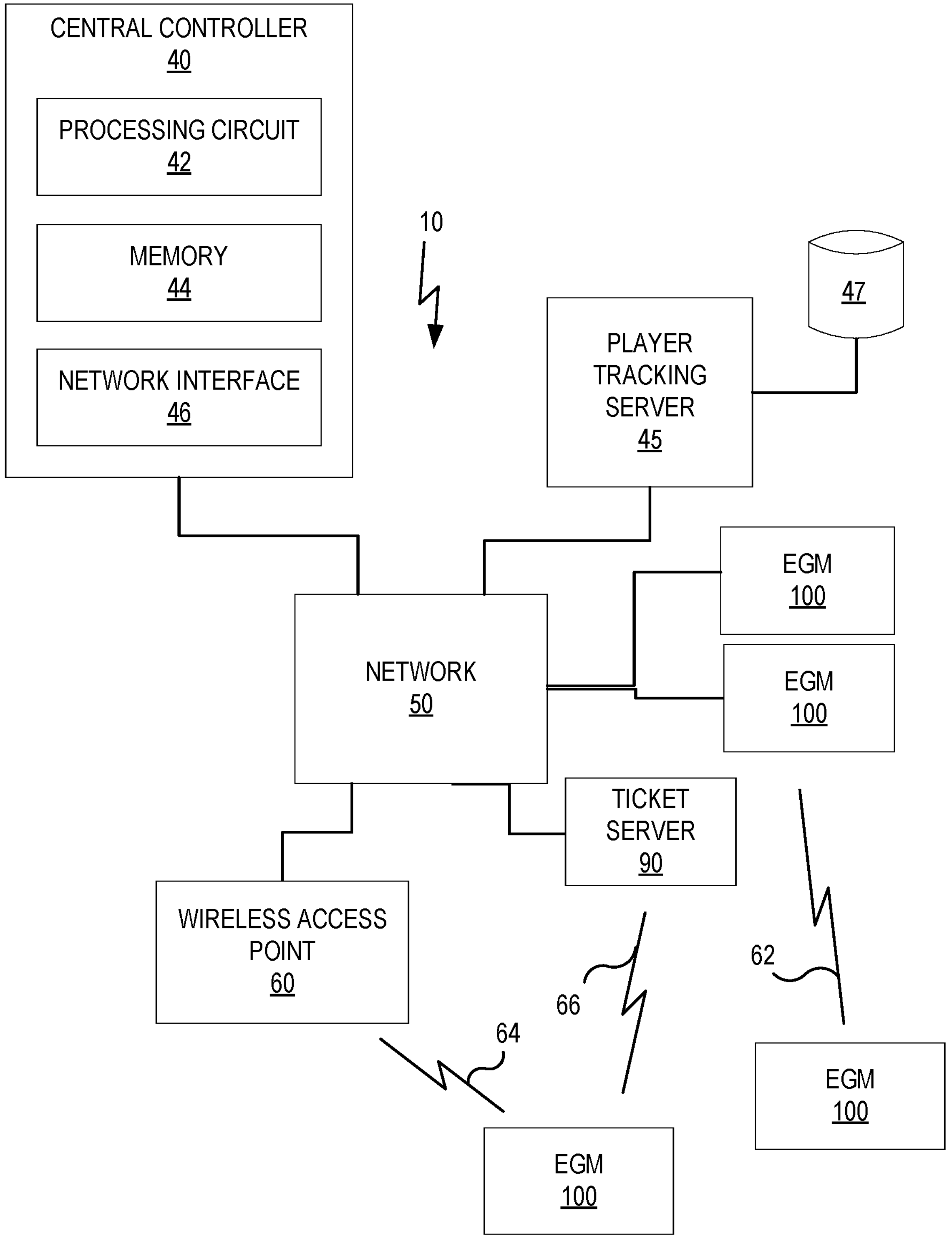
FIG. 1 is a schematic block diagram illustrating an example of a network configuration for a plurality of gaming devices according to some embodiments.

Before describing these and other embodiments in detail, reference is made to FIG. 1, which illustrates a gaming system 10 including a plurality of gaming devices 100. As discussed above, the gaming devices 100 may be one type of a variety of different types of gaming devices, such as electronic gaming machines (EGMs), mobile devices, or other devices, for example. The gaming system 10 may be located, for example, on the premises of a gaming establishment, such as a casino. The gaming devices 100, which are typically situated on a casino floor, may be in communication with each other and/or at least one central controller 40 through a data communication network 50 that may include a remote communication link. The data communication network 50 may be a private data communication network that is operated, for example, by the gaming facility that operates the gaming devices 100. Communications over the data communication network 50 may be encrypted for security. The central controller 40 may be any suitable server or computing device which includes at least one processor circuit and at least one memory or storage device. Each gaming device 100 may include a processor circuit that transmits and receives events, messages, commands or any other suitable data or signal between the gaming device 100 and the central controller 40. The gaming device processor circuit is operable to execute such communicated events, messages or commands in conjunction with the operation of the gaming device 100. Moreover, the processor circuit of the central controller 40 is configured to transmit and receive events, messages, commands or any other suitable data or signal between the central controller 40 and each of the individual gaming devices 100. In some embodiments, one or more of the functions of the central controller 40 may be performed by one or more gaming device processor circuits. Moreover, in some embodiments, one or more of the functions of one or more gaming device processor circuits as disclosed herein may be performed by the central controller 40.

A wireless access point 60 provides wireless access to the data communication network 50. The wireless access point 60 may be connected to the data communication network 50 as illustrated in FIG. 1, and/or may be connected directly to the central controller 40 or another server connected to the data communication network 50.

A player tracking server 45 may also be connected through the data communication network 50. The player tracking server 45 may manage a player tracking account that tracks the player's gameplay and spending and/or other player preferences and customizations, manages loyalty awards for the player, manages funds deposited or advanced on behalf of the player, and other functions. Player information managed by the player tracking server 45 may be stored in a player information database 47.

As further illustrated in FIG. 1, the gaming system 10 may include a ticket server 90 that is configured to print and/or dispense wagering tickets. The ticket server 90 may be in communication with the central controller 40 through the data communication network 50. Each ticket server 90 may include a processor circuit that transmits and receives events, messages, commands or any other suitable data or signal between the ticket server 90 and the central controller 40. The ticket server 90 processor circuit may be operable to execute such communicated events, messages or commands in conjunction with the operation of the ticket server 90. Moreover, in some embodiments, one or more of the functions of one or more ticket server 90 processor circuits as disclosed herein may be performed by the central controller 40.

The gaming devices 100 communicate with one or more elements of the gaming system 10 to coordinate providing wagering games and other functionality. For example, in some embodiments, the gaming device 100 may communicate directly with the ticket server 90 over a wireless interface 62, which may be a WiFi link, a Bluetooth link, an NFC link, etc. In other embodiments, the gaming device 100 may communicate with the data communication network 50 (and devices connected thereto, including other gaming devices 100) over a wireless interface 64 with the wireless access point 60. The wireless interface 64 may include a WiFi link, a Bluetooth link, an NFC link, etc. In still further embodiments, the gaming devices 100 may communicate simultaneously with both the ticket server 90 over the wireless interface 66 and the wireless access point 60 over the wireless interface 64. Some embodiments provide that gaming devices 100 may communicate with other gaming devices over a wireless interface 64. In these embodiments, wireless interface 62, wireless interface 64 and wireless interface 66 may use different communication protocols and/or different communication resources, such as different frequencies, time slots, spreading codes, etc.

Figure 2A:
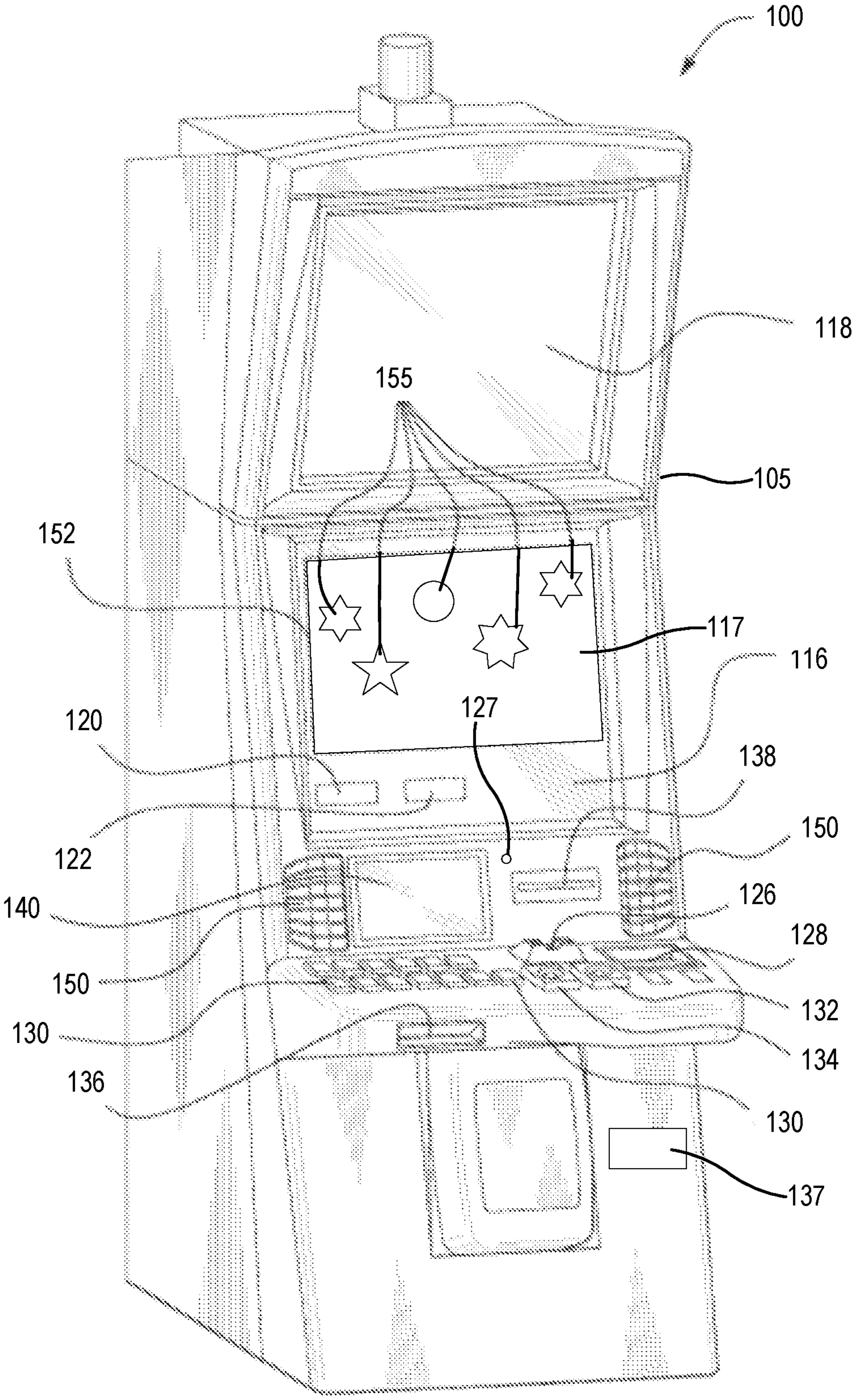
FIGS. 2A-E are diagrams illustrating examples of gaming devices according to some embodiments.
Figure 2B:
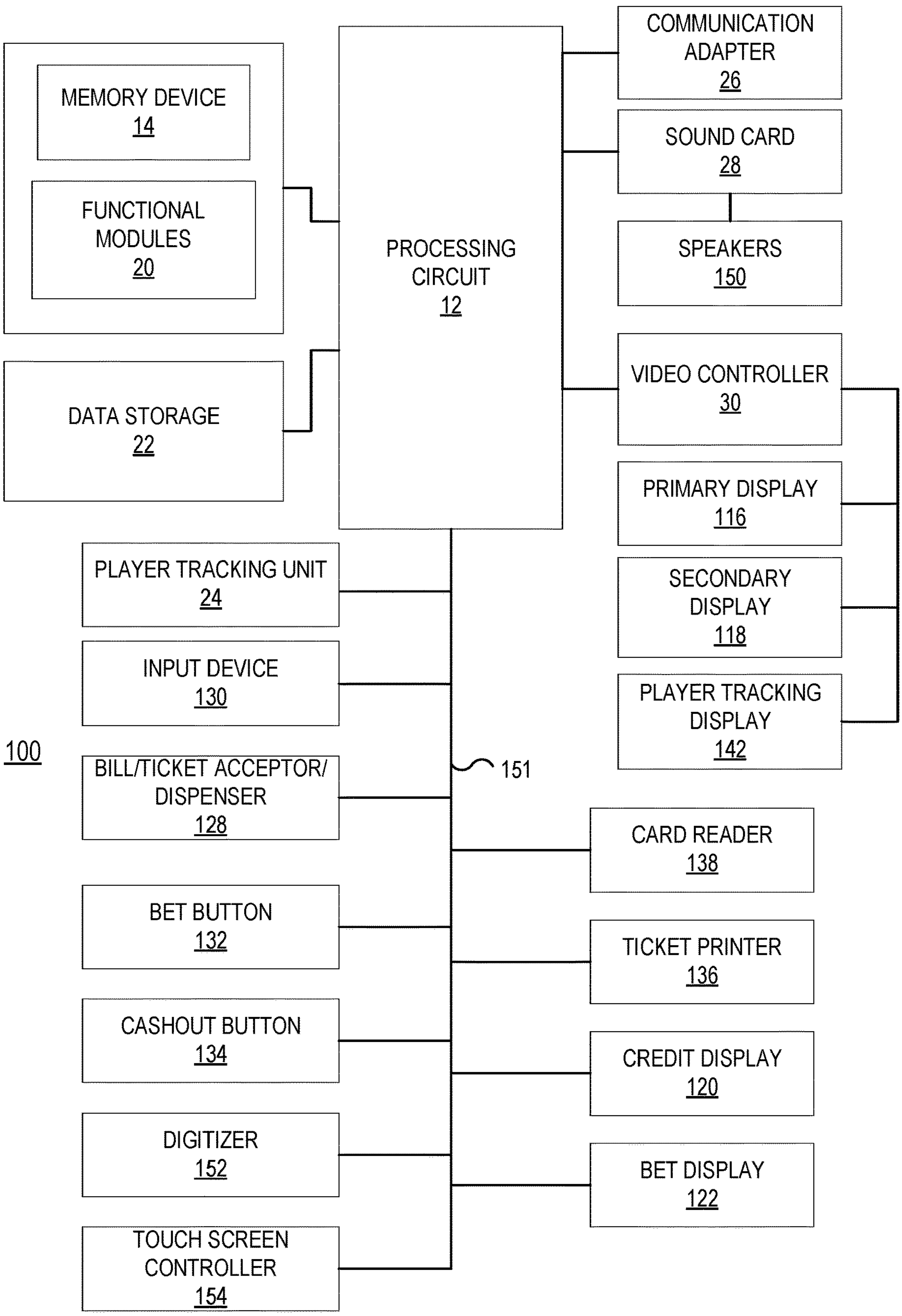
Figure 2C:
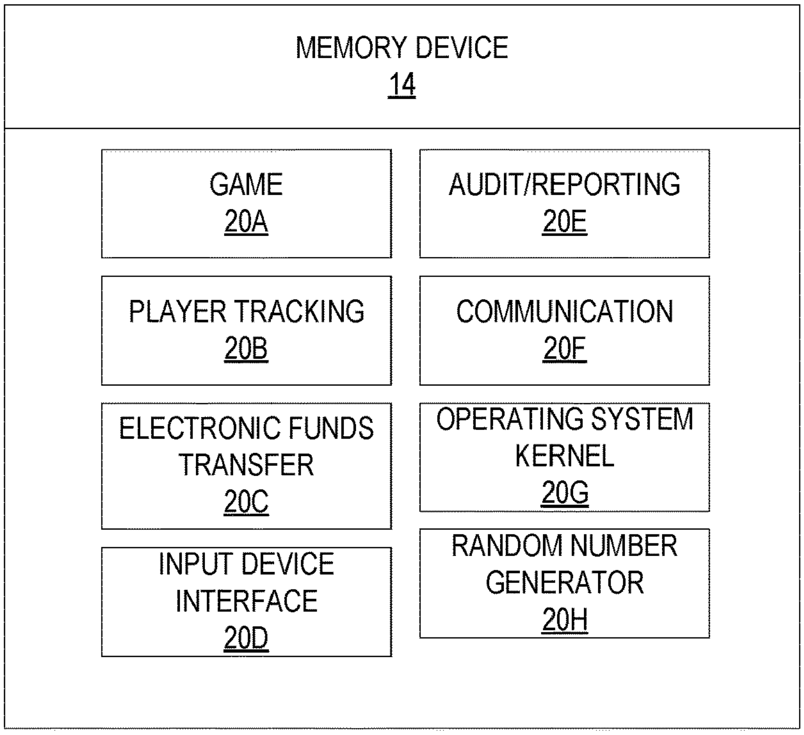

Embodiments herein may include different types of gaming devices. Various embodiments are illustrated in FIGS. 2A, 2B, and 2C in which FIG. 2A is a perspective view of a gaming device 100 illustrating various physical features of the device, FIG. 2B is a functional block diagram that schematically illustrates an electronic relationship of various elements of the gaming device 100, and FIG. 2C illustrates various functional modules that can be stored in a memory device of the gaming device 100. The embodiments shown in FIGS. 2A-C are provided as examples for illustrative purposes only. It will be appreciated that gaming devices may come in many different shapes, sizes, layouts, form factors, and configurations, and with varying numbers and types of input and output devices, and that embodiments of the inventive concepts are not limited to the particular gaming device structures described herein.

Gaming devices 100 typically include a number of standard features, many of which are illustrated in FIGS. 2A-B. For example, referring to FIG. 2A, a gaming device 100 may include a support structure, housing 105 (e.g., cabinet) which provides support for a plurality of displays, inputs, outputs, controls and other features that enable a player to interact with the gaming device 100.

The gaming device 100 illustrated in FIG. 2A includes a number of display devices, including a primary display device 116 located in a central portion of the housing 105 and a secondary display device 118 located in an upper portion of the housing 105. A plurality of game components 155 are displayed on a display screen 117 of the primary display device 116. It will be appreciated that one or more of the display devices 116, 118 may be omitted, or that the display devices 116, 118 may be combined into a single display device. The gaming device 100 may further include a player tracking display 142, a credit display 120, and a bet display 122. The credit display 120 displays a player's current number of credits, cash, account balance or the equivalent. The bet display 122 displays a player's amount wagered. Locations of these displays are merely illustrative as any of these displays may be located anywhere on the gaming device 100.

The player tracking display 142 may be used to display a service window that allows the player to interact with, for example, their player loyalty account to obtain features, bonuses, comps, etc. In other embodiments, additional display screens may be provided beyond those illustrated in FIG. 2A. In some embodiments, one or more of the player tracking display 142, the credit display 120 and the bet display 122 may be displayed in one or more portions of one or more other displays that display other game related visual content. For example, one or more of the player tracking display 142, the credit display 120 and the bet display 122 may be displayed in a picture in a picture on one or more displays.

The gaming device 100 may further include a number of input devices 130 that allow a player to provide various inputs to the gaming device 100, either before, during or after a game has been played. The gaming device may further include a game play initiation button 132 and a cashout button 134. The cashout button 134 is utilized to receive a cash payment or any other suitable form of payment corresponding to a quantity of remaining credits of a credit display.

In some embodiments, one or more input devices of the gaming device 100 are one or more game play activation devices that are each used to initiate a play of a game on the gaming device 100 or a sequence of events associated with the gaming device 100 following appropriate funding of the gaming device 100. The example gaming device 100 illustrated in FIGS. 2A and 2B includes a game play activation device in the form of a game play initiation button 132. It should be appreciated that, in other embodiments, the gaming device 100 begins game play automatically upon appropriate funding rather than upon utilization of the game play activation device.

In some embodiments, one or more input device 130 of the gaming device 100 may include wagering or betting functionality. For example, a maximum wagering or betting function may be provided that, when utilized, causes a maximum wager to be placed. Another such wagering or betting function is a repeat the bet device that, when utilized, causes the previously placed wager to be placed. A further such wagering or betting function is a bet one function. A bet is placed upon utilization of the bet one function. The bet is increased by one credit each time the bet one device is utilized. Upon the utilization of the bet one function, a quantity of credits shown in a credit display (as described below) decreases by one, and a number of credits shown in a bet display (as described below) increases by one.

In some embodiments, as shown in FIG. 2B, the input device(s) 130 may include and/or interact with additional components, such as a touch-sensitive display that includes a digitizer 152 and a touchscreen controller 154 for touch input devices, as disclosed herein. The player may interact with the gaming device 100 by touching virtual buttons on one or more of the display devices 116, 118, 140. Accordingly, any of the above-described input devices, such as the input device 130, the game play initiation button 132 and/or the cashout button 134 may be provided as virtual buttons or regions on one or more of the display devices 116, 118, 140.

Referring briefly to FIG. 2B, operation of the primary display device 116, the secondary display device 118 and the player tracking display 142 may be controlled by a video controller 30 that receives video data from a processor circuit 12 or directly from a memory device 14 and displays the video data on the display screen. The credit display 120 and the bet display 122 are typically implemented as simple LCD or LED displays that display a number of credits available for wagering and a number of credits being wagered on a particular game. Accordingly, the credit display 120 and the bet display 122 may be driven directly by the processor circuit 12. In some embodiments however, the credit display 120 and/or the bet display 122 may be driven by the video controller 30. The gaming device 100 may also include a player tracking unit 24 for managing communications and functionality between the processor circuit 12 and certain peripherals and components. Player tracking units 24 may be standardized across machine types to operate interchangeably across a manufacturer's lineup.

Referring again to FIG. 2A, the display devices 116, 118, 140 may include, without limitation: a cathode ray tube, a plasma display, a liquid crystal display (LCD), a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In certain embodiments, as described above, the display devices 116, 118, 140 may include a touchscreen with an associated touchscreen controller 154 and digitizer 152. The display devices 116, 118, 140 may be of any suitable size, shape, and/or configuration. The display devices 116, 118, 140 may include flat or curved display surfaces.

The display devices 116, 118, 140 and video controller 30 of the gaming device 100 are generally configured to display one or more game and/or non-game images, symbols, and indicia. In certain embodiments, the display devices 116, 118, 140 of the gaming device 100 are configured to display any suitable visual representation or exhibition of the movement of objects; dynamic lighting; video images; images of people, characters, places, things, and faces of cards; and the like. In certain embodiments, the display devices 116, 118, 140 of the gaming device 100 are configured to display one or more virtual reels, one or more virtual wheels, and/or one or more virtual dice. In other embodiments, certain of the displayed images, symbols, and indicia are in mechanical form. That is, in these embodiments, the display device 116, 118, 140 includes any electromechanical device, such as one or more rotatable wheels, one or more reels, and/or one or more dice, configured to display at least one or a plurality of game or other suitable images, symbols, or indicia.

The gaming device 100 also includes various features that enable a player to deposit credits in the gaming device 100 and withdraw credits from the gaming device 100, such as in the form of a payout of winnings, credits, etc. For example, the gaming device 100 may include a bill/ticket printer 136, a bill/ticket acceptor/dispenser 128, that allows the player to deposit and/or receive tickets and/or currency into the gaming device 100.

As illustrated in FIG. 2A, the gaming device 100 may also include a currency dispenser 137 that may include a note dispenser configured to dispense paper currency and/or a coin generator configured to dispense coins or tokens in a coin payout tray.

The gaming device 100 may further include one or more speakers 150 controlled by one or more sound cards 28 (FIG. 2B). The gaming device 100 illustrated in FIG. 2A includes a pair of speakers 150. In other embodiments, additional speakers, such as surround sound speakers, may be provided within or on the housing 105. Moreover, the gaming device 100 may include built-in seating with integrated headrest speakers.

In various embodiments, the gaming device 100 may generate dynamic sounds coupled with attractive multimedia images displayed on one or more of the display devices 116, 118, 140 to provide an audio-visual representation or to otherwise display full-motion video with sound to attract players to the gaming device 100 and/or to engage the player during gameplay. In certain embodiments, the gaming device 100 may display a sequence of audio and/or visual attraction messages during idle periods to attract potential players to the gaming device 100. The videos may be customized to provide any appropriate information.

The gaming device 100 may further include a card reader 138 that is configured to read magnetic stripe cards, such as player loyalty/tracking cards, chip cards, and the like. In some embodiments, a player may insert an identification card into a card reader of the gaming device. In some embodiments, the identification card is a smart card having a programmed microchip or a magnetic strip coded with a player's identification, credit totals (or related data) and other relevant information. In other embodiments, a player may carry a portable device, such as a cell phone, a radio frequency identification tag or any other suitable wireless device, which communicates a player's identification, credit totals (or related data) and other relevant information to the gaming device. In some embodiments, money may be transferred to a gaming device through electronic funds transfer. When a player funds the gaming device, the processor circuit determines the amount of funds entered and displays the corresponding amount on the credit or other suitable display as described above.

In some embodiments, the gaming device 100 may include an electronic payout device or module configured to fund an electronically recordable identification card or smart card or a bank or other account via an electronic funds transfer to or from the gaming device 100.

FIG. 2B is a block diagram that illustrates logical and functional relationships between various components of a gaming device 100. It should also be understood that components described in FIG. 2B may also be used in other computing devices, as desired, such as mobile computing devices for example. As shown in FIG. 2B, the gaming device 100 may include a processor circuit 12 that controls operations of the gaming device 100. Although illustrated as a single processor circuit, multiple special purpose and/or general-purpose processors and/or processor cores may be provided in the gaming device 100. For example, the gaming device 100 may include one or more of a video processor, a signal processor, a sound processor and/or a communication controller that performs one or more control functions within the gaming device 100. The processor circuit 12 may be variously referred to as a "controller," "microcontroller," "microprocessor" or simply a "computer." The processor may further include one or more application-specific integrated circuits (ASICs).

Various components of the gaming device 100 are illustrated in FIG. 2B as being connected to the processor circuit 12. It will be appreciated that the components may be connected to the processor circuit 12 through a system bus 151, a communication bus and controller, such as a USB controller and USB bus, a network interface, or any other suitable type of connection.

The gaming device 100 further includes a memory device 14 that stores one or more functional modules 20. Various functional modules 20 of the gaming device 100 will be described in more detail below in connection with FIG. 2D.

The memory device 14 may store program code and instructions, executable by the processor circuit 12, to control the gaming device 100. The memory device 14 may also store other data such as image data, event data, player input data, random or pseudo-random number generators, pay-table data or information and applicable game rules that relate to the play of the gaming device. The memory device 14 may include random access memory (RAM), which can include non-volatile RAM (NVRAM), magnetic RAM (ARAM), ferroelectric RAM (FeRAM) and other forms as commonly understood in the gaming industry. In some embodiments, the memory device 14 may include read only memory (ROM). In some embodiments, the memory device 14 may include flash memory and/or EE PROM (electrically erasable programmable read only memory). Any other suitable magnetic, optical and/or semiconductor memory may operate in conjunction with the gaming device disclosed herein.

The gaming device 100 may further include a data storage 22, such as a hard disk drive or flash memory. The data storage 22 may store program data, player data, audit trail data or any other type of data. The data storage 22 may include a detachable or removable memory device, including, but not limited to, a suitable cartridge, disk, CD ROM, DVD or USB memory device.

The gaming device 100 may include a communication adapter 26 that enables the gaming device 100 to communicate with remote devices over a wired and/or wireless communication network, such as a local area network (LAN), wide area network (WAN), cellular communication network, or other data communication network. The communication adapter 26 may further include circuitry for supporting short range wireless communication protocols, such as Bluetooth and/or near field communications (NFC) that enable the gaming device 100 to communicate, for example, with a mobile communication device operated by a player.

The gaming device 100 may include one or more internal or external communication ports that enable the processor circuit 12 to communicate with and to operate with internal or external peripheral devices, such as eye tracking devices, position tracking devices, cameras, accelerometers, arcade sticks, bar code readers, bill validators, biometric input devices, bonus devices, button panels, card readers, coin dispensers, coin hoppers, display screens or other displays or video sources, expansion buses, information panels, keypads, lights, mass storage devices, microphones, motion sensors, motors, printers, reels, SCSI ports, solenoids, speakers, thumb drives, ticket readers, touch screens, trackballs, touchpads, wheels, and wireless communication devices. In some embodiments, internal or external peripheral devices may communicate with the processor circuit through a universal serial bus (USB) hub (not shown) connected to the processor circuit 12.

In some embodiments, the gaming device 100 may include a sensor, such as a camera 127, in communication with the processor circuit 12 (and possibly controlled by the processor circuit 12) that is selectively positioned to acquire an image of a player actively using the gaming device 100 and/or the surrounding area of the gaming device 100. In one embodiment, the camera 127 may be configured to selectively acquire still or moving (e.g., video) images and may be configured to acquire the images in either an analog, digital or other suitable format. The display devices 116, 118, 140 may be configured to display the image acquired by the camera 127 as well as display the visible manifestation of the game in split screen or picture-in-picture fashion. For example, the camera 127 may acquire an image of the player and the processor circuit 12 may incorporate that image into the primary and/or secondary game as a game image, symbol or indicia.

Various functional modules of that may be stored in a memory device 14 of a gaming device 100 are illustrated in FIG. 2C. Referring to FIG. 2C, the gaming device 100 may include in the memory device 14 a game module 20A that includes program instructions and/or data for operating a hybrid wagering game as described herein. The gaming device 100 may further include a player tracking module 20B, an electronic funds transfer module 20C, an input device interface 20D, an audit/reporting module 20E, a communication module 20F, an operating system kernel 20G and a random number generator 20H. The player tracking module 20B keeps track of the play of a player. The electronic funds transfer module 20C communicates with a back-end server or financial institution to transfer funds to and from an account associated with the player. The input device interface 20D interacts with input devices, such as the input device 130, as described in more detail below. The communication module 20F enables the gaming device 100 to communicate with remote servers and other gaming devices using various secure communication interfaces. The operating system kernel 20G controls the overall operation of the gaming device 100, including the loading and operation of other modules. The random number generator 20H generates random or pseudorandom numbers for use in the operation of the hybrid games described herein.

Many embodiments described herein employ gaming devices 100 that are land-based EGMs, such as banks of slot machines in a casino environment, but in some embodiments, a gaming device 100 may additionally or alternatively include a personal device, such as a desktop computer, a laptop computer, a mobile device, a tablet computer or computing device, a personal digital assistant (PDA), or other portable computing devices. In some embodiments, the gaming device 100 may be operable over a wireless network, such as part of a wireless gaming system. In such embodiments, the gaming machine may be a hand-held device, a mobile device or any other suitable wireless device that enables a player to play any suitable game at a variety of different locations. It should be appreciated that a gaming device or gaming machine as disclosed herein may be a device that has obtained approval from a regulatory gaming commission or a device that has not obtained approval from a regulatory gaming commission.

Figure 2D:
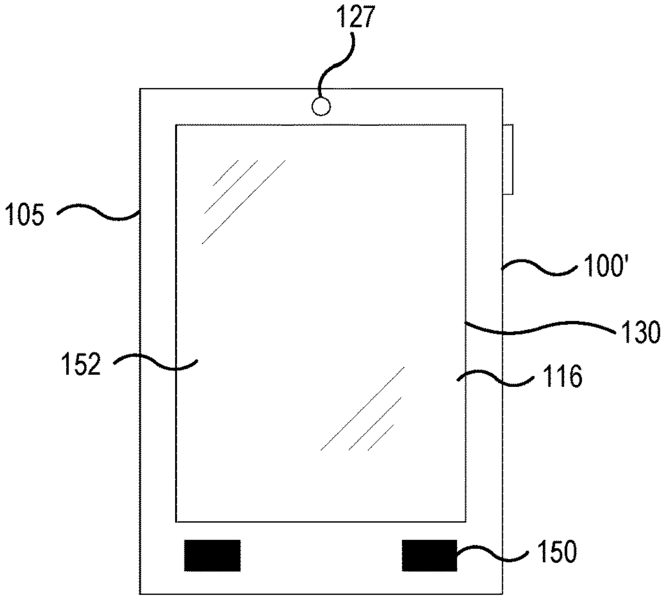

For example, referring to FIG. 2D, a gaming device 100' may be implemented as a handheld device including a compact housing 105 on which is mounted a touchscreen display device 116 including a digitizer 152. As described in greater detail with respect to FIG. 3 below, one or more input devices 130 may be included for providing functionality of for embodiments described herein. A camera 127 may be provided in a front face of the housing 105. The housing 105 may include one or more speakers 150. In the gaming device 100', various input buttons described above, such as the cashout button, gameplay activation button, etc., may be implemented as soft buttons on the touchscreen display device 116 and/or input device 130. In this embodiment, the input device 130 is integrated into the touchscreen display device 116, but it should be understood that the input device may also, or alternatively, be separate from the display device 116. Moreover, the gaming device 100' may omit certain features, such as a bill acceptor, a ticket generator, a coin acceptor or dispenser, a card reader, secondary displays, a bet display, a credit display, etc. Credits can be deposited in or transferred from the gaming device 100' electronically.

Figure 2E:
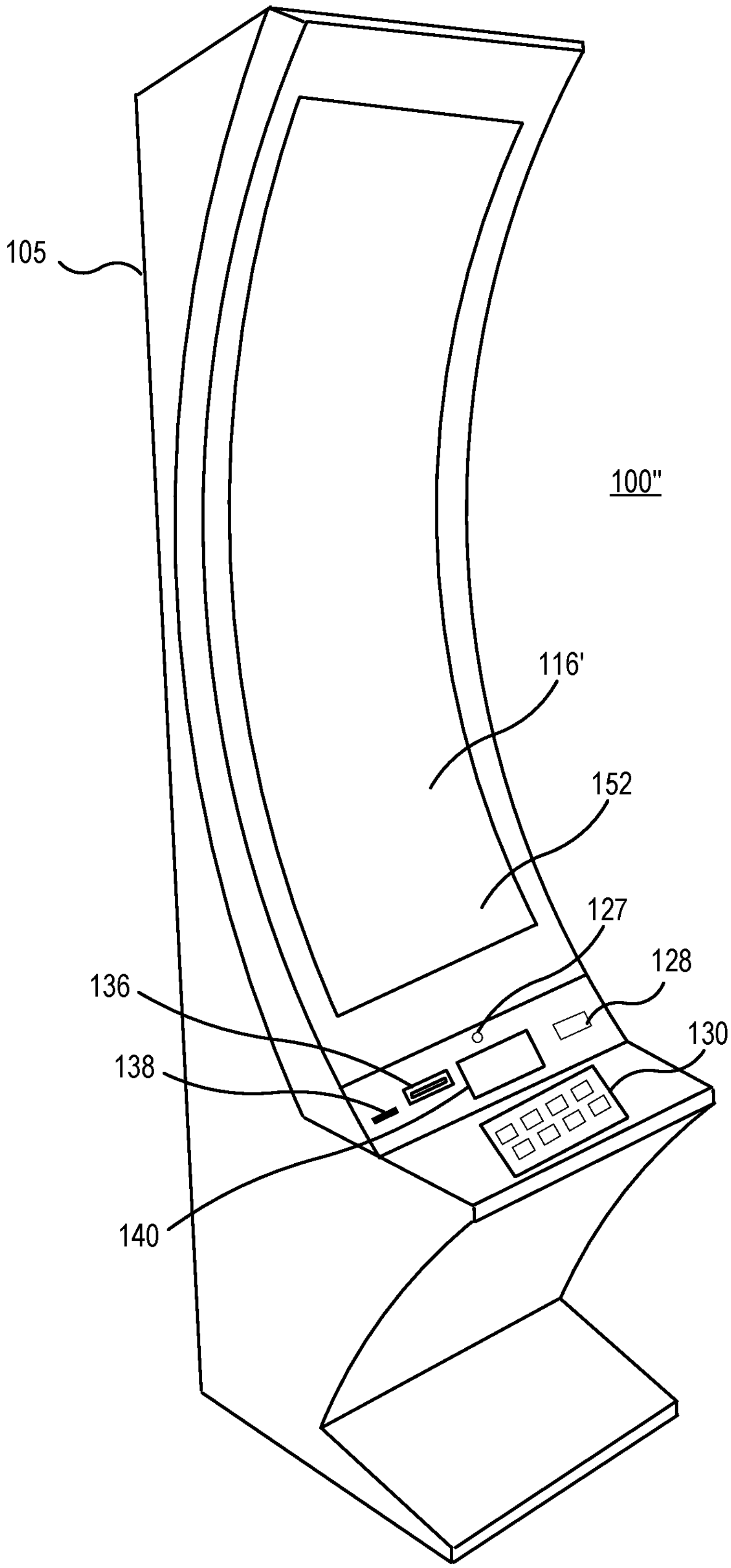

FIG. 2E illustrates a standalone gaming device 100", i.e., an EGM in this example, having a different form factor from the gaming device 100 illustrated in FIG. 2A. In particular, the gaming device 100" is characterized by having a large, high aspect ratio, curved primary display device 116' provided in the housing 105, with no secondary display device. The primary display device 116' may include a digitizer 152 to allow touchscreen interaction with the primary display device 116'. The gaming device 100" may further include a player tracking display 142, an input device 130, a bill/ticket acceptor 128, a card reader 138, and a bill/ticket dispenser 136. The gaming device 100" may further include one or more cameras 127 to enable facial recognition and/or motion tracking.

Although illustrated as certain gaming devices, such as electronic gaming machines (EGMs) and mobile devices, similar functions and/or operations as described herein may include wagering stations that may include electronic game tables, conventional game tables including those involving cards, dice and/or roulette, and/or other wagering stations such as sports book stations, video poker games, skill-based games, virtual casino-style table games, or other casino or non-casino style games. Further, gaming devices according to embodiments herein may be implemented using other computing devices and mobile devices, such as smart phones, tablets, and/or personal computers, among others.

A progressive style game can be defined as a game in which there is an incrementing or non-standard award available instead of the standard fixed prize per win. Each game cycle can have a chance to win and can cause the award value to increment. Once the win occurs, the award can be reset to a starting amount and the process can start again.

A progressive game can be played on a gaming device such as an Electronic Gaming Machine ("EGM"), sports betting terminal, or Video Lottery Terminal ("VLT"). In some examples, all the applicable gaming devices connect to a service called a progressive controller, that will update and broadcast the current prize values. The gaming devices can be connected to one or more progressive services and the award levels can be linked to multiple gaming devices, multiple themes on a single gaming device, or within a unique theme on a single gaming device. Any gaming device connected to the service can award the progressive to a player.

In some examples, the gaming devices are also connected to a host management system. The host management system can install or remove themes from the gaming device, monitor the state of the gaming device, acquire accounting information for the system, and configures the gaming device.

Progressive style games can be very popular, but can require a high amount of oversight by regulatory bodies. In some examples, progressive games provide multiple levels of enticement for the player. There are the incrementing award values presented to the player that drive anticipation. The communal aspect of some progressive games provide large awards that are attractive to many players, because they can offer a relatively substantial prize compared to the wagered amount. However, specific progressive games will often grow stale amongst players, and they will seek out new experiences.

Stale progressive games can cause operators to want to change the environment and ultimately the experience for the player. However, regulations and business practices can cause the operators to follow a process that makes deploying new progressive games labor intensive and prone to manual error. As a result, operators may keep games installed longer than desired, purely due to the logistics of replacing the progressive game.

In some examples, regulations associated with updating or replacing an existing progressive controller generally require that any value contributed to the progressive pool from players must be accounted for and made available for awarding in a similar environment as soon as possible. As a result, an operator cannot set up a progressive game, allow the progressive to rise to a large amount, then remove the game without being prepared to set up an acceptable replacement game. Furthermore, when operation of a progressive game is ceased, a technician must physically interact with a gaming device to determine the latest value of the progressive pool, remove the progressive game, and install a new progressive game (a process that can be lengthy and require EGM downtime). In some examples, it takes too much time for an operator to adjust the casino floor by removing older progressive games and installing new ones when an existing progressive game is performing poorly and/or a new progressive game is released that is expected to perform better.

As described above, a progressive game can be played on a gaming device such as an EGM. The award levels can be linked to multiple gaming devices, multiple themes on a gaming device, or within a single theme on an individual gaming device. The commonality amongst these varying deployments is there is a progressive controller that provides the current award value to all the associated equipment.

Various embodiments herein describe all the gaming devices and the progressive controller being in communication with the progressive pool management system. The EGMs can have any of several progressive configurations (e.g., stand alone, linked, and wide area). The progressive pool management system allows the operator to remotely install, configure, and remove the gaming devices remotely from a user interface. The progressive pool management system can update the progressive ecosystem to make the process simple and sometimes transparent to the operator.

Figure 3:
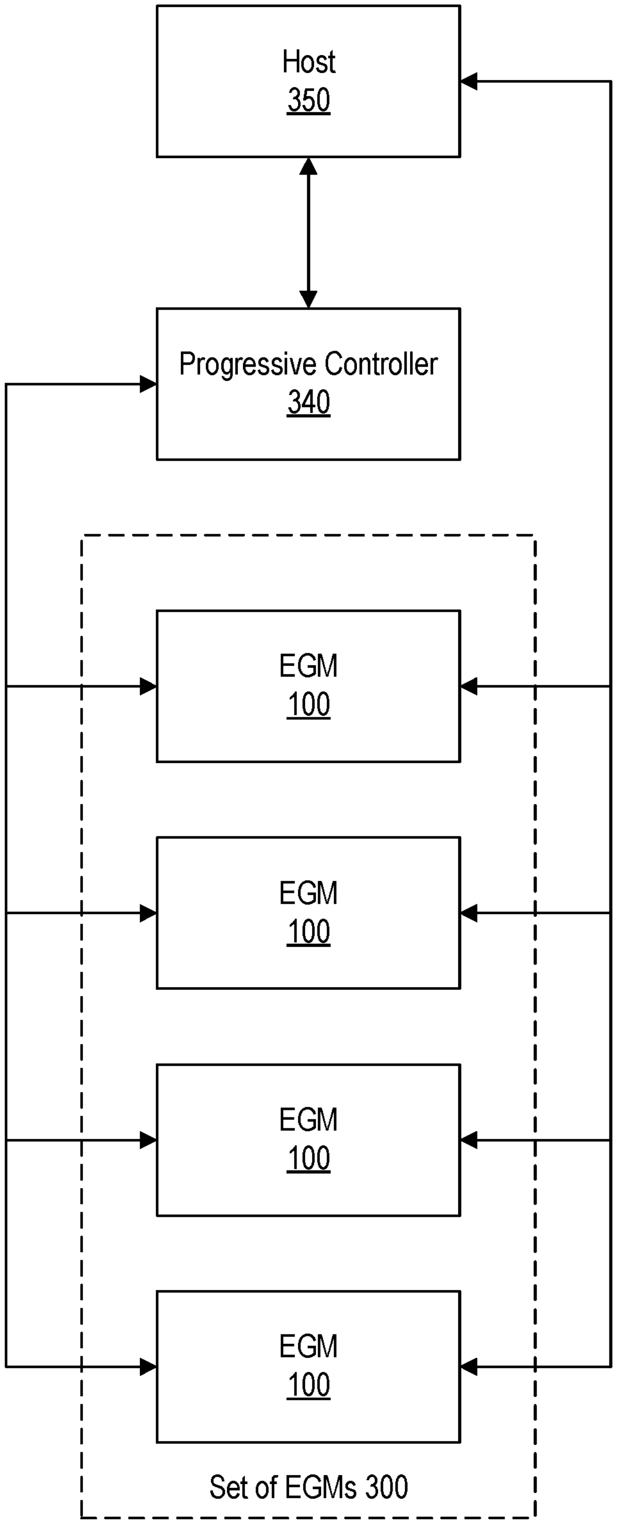
FIG. 3 is a block diagram illustrating an example of a network configuration for handling a progressive game according to some embodiments.

FIG. 3 illustrates an example of a system for managing a progressive pool. In this example, the system includes a set of EGMs 300, a progressive controller 340, and a host 350. The set of EGMs 300 can include EGMs 100 providing a first progressive game and/or capable of providing a second progressive game. The progressive controller 340 can be communicatively coupled to each of the EGMs 100 and communicate with the EGMs 100 to keep a record of a progressive pool associated with the progressive game. The host 350 can be communicatively coupled to each of the EGMs 100 and communicate with the EGMs 100 to install and/or modify progressive games provided by the EGMs 100. The progressive controller 340 and the host 350 can be communicatively coupled to allow the progressive controller 340 to provide information about the progressive game, progressive pool, or EGMs 100 to the host 350.

In other examples, there can be any number of EGMs or progressive controllers under management of the host system, including no progressive controllers. In additional or alternative examples, an EGM can handle the operations of a progressive controller and/or a host.

Figure 4:
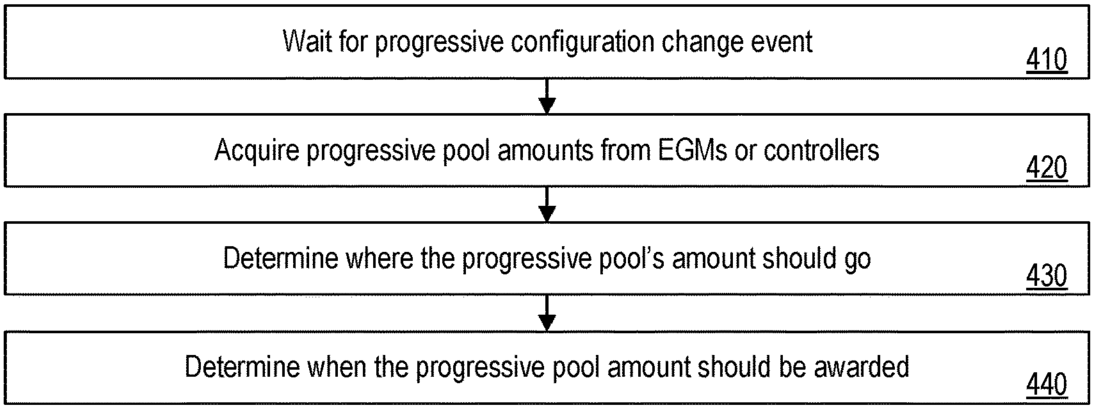
FIGS. 4-7 are flow charts illustrating examples of operations for automated progressive pool management according to some embodiments.

FIG. 4 illustrates an example of operations performed by the system of FIG. 3 for managing a progressive pool.

At block 410, the host 350 waits for a progressive configuration change event. In some embodiments, a trigger includes the operator or host system determining it wants to remove an existing game. The operation may want to remove the existing game because it is underperforming, there is a new version of the same game, or the game must be removed for regulatory reason.

In additional or alternative embodiments, the trigger is the awarding of one or more progressive levels. In some examples, the operator has configured the host 350 to retire the progressive pool and progressive game the next time the progressive is awarded. The host 350 may disable the game in response to the progressive award being provided to prevent further play of the game.

In additional or alternative embodiments, the trigger includes the release of a new game or an update to an existing game. For example, the host 350 learns there is an updated version of an existing (and installed) game called Wheel of Fortune. That game has progressive links and the host 350 is configured to automatically install updates to already installed games. Similarly, the trigger could happen when new progressive controller software is available.

At block 420, the host 350 uses a network protocol to communicate with the EGMs 100 or the progressive controller 340 to learn the current progressive amounts. In some examples, the host 350 learns the values, stores, and logs them. In additional or alternative examples, the host 350 can communicate with the EGMs 100 or the progressive controller to determine a controller type (e.g., standalone, linked, wide area, symbol driven, or mystery). In additional or alternative examples, the host 350 can communicate with the EGMs 100 or the progressive controller to determine, for each progressive level: denomination; probability of the associated win levels or game award levels eligible to win the progressive level; and current value. In additional or alternative examples, the host 350 can communicate with the EGMs 100 or the progressive controller can store and/or log a date/time when the information was collected.

In additional or alternative embodiments, the host 350 effectively takes ownership of the progressive pool amounts. Once the collection and recording process is complete, the host 350 can complete the retirement of the current progressive controller(s).

At block 430, now that the host 350 "owns" the progressive amounts it must decide what to do with them. There are many choices with many configurations. In some embodiments, the host 350 decides which game(s) to give the amounts to.

If the host 350 decides to give the money to EGMs or progressive controllers, it must determine which EGMs and controllers. In some examples, the host 350 asks the operator where to move the money. In additional or alternative examples, the host 350 automatically decides where to move the money. The host 350 may have a configuration or algorithm that moves the money to a random machine, a similar machine (similar theme, game type, odds, configuration, progressive style). When done automatically, the operator may not even be aware of how this determination is made as it may be complicated for a human to know the regulations and rules for moving the money. In additional or alternative examples, the host 350 determines the targets and then requires the operator confirm or modify the decisions made by the host 350.

In some embodiments, the host 350 moves the money to multiple controllers. For example, a host 350 retires a progressive game with a progressive pool that is currently worth $1000. The host 350 knows of 10 progressive controllers on a casino floor and automatically determines to allocated $100 of the progressive pool to each of the 10 progressive controllers. In additional or alternative examples, the host 350 may allocate the targets based on various parameters including the popularity of the target progressive games, the amount of play of the target progressive games, time of day, some random value, or some weighted random value. In additional or alternative examples, the host 350 could try to even out the level values across multiple instances of the same type of progressive controller across the floor. This may help normalize the appeal of different banks of the same type of progressive across the floor. In this manner the amount applied to each EGM and controller could be different.

In additional or alternative embodiments, the host 350 many apply one or many of the different strategies. For example, the host 350 may provide some of the pool to some EGMs, some of it to some progressive controllers, and mark some of it for a giveaway.

At block 440, the host 350 knows which values it wants to move and now it must determine when to move the money. In some embodiments, the host 350 performs the operation immediately. However, the target game or system may not yet be installed or the casino many be fully occupied and configuring the system may require the operator to disable some EGMs.

In additional or alternative embodiments, the operation is performed when one or more EGMs or controllers are installed. This would be used when upgrading or changing out a game theme. The system can remove the old game, install the new game, and then move the escrowed money to the new game.

In additional or alternative embodiments, the operation is performed at a scheduled time such as at 6 am when the casino is empty.

Some regulations may require progressive pool money to be moved within a certain time period, such as within 30 days. In these markets (or when the host is configured like this), the host system can warn the operator that the operation is reaching the limit. For example, the host system may have retired some money from an older pool but is waiting for the installation trigger (Block 440 of FIG. 4). After 29 days, the host system might warn the operator about a 30-day regulatory or configuration limit. In response to reaching the regulator or configuration limit (or at a predetermined time prior to the limit), the system may automatically trigger the originally planned transfer/installation, switch to another delivery method (re-evaluate Block 430 of FIG. 4), or notify the regulator.

When re-evaluating Block 430 of FIG. 4, the host may pick different controllers, EGMs, or another algorithm for determining how to allocate the progressive pool. For example, the host may be waiting for a progressive hit to trigger, but it doesn't happen so the host simply starts a giveaway to get the money to one or more players immediately. As a last resort the system can simply move the money to any valid source immediately.

In some examples, a giveaway is a broad term to describe a system where money is given to players not from a progressive hit at the game. The operator could physically hand money to players or could trigger a mystery progressive or Lucky Coin event or a celebration prize from the host system.

In some embodiments, to meet the regulatory and accounting needs of the casino and market, a host system will log all events, operator input, and decisions. This will allow regulators or accountants to review what has happened and how to account for the money.

In additional or alternative embodiments, the system may also periodically (e.g., hourly or daily), or in real-time monitor the current values of the progressive levels in one or more controllers so that if any component failure occurs, such as a progressive controller component, then the host system has a record of the previous progressive levels so that the funds in the levels are not lost. In some examples, the host system could facilitate restoring the failed progressive controller to have the same (or approximately the same) value(s) that it had prior to the failure. In additional or alternative examples, the host system can help facilitate moving the funds recorded to other progressive controllers across the floor or connected sites to ensure that the funds contributed by players are not lost.

In additional or alternative embodiments, the host system may determine a plan automatically or with some operator input. The plan can then be presented to a regulator for approval before any or all of the operations are completed.

In additional or alternative embodiments, the host system may determine a plan automatically or with some operator input. The plan can then be presented to an operator for approval before any or all of the operations are completed.

In additional or alternative embodiments, the host is under control of a gaming supplier. In additional or alternative embodiments, the operator, the gaming supplier, and the regulator all have access to the host system for various similar or different tasks.

In additional or alternative embodiments, in the event of an error condition the host system may abandon the reallocation process. In this event, the host may transfer the pools back to the original EGM or controller or the host system may simply create paperwork or tasks for an operator to move the pools in the legacy manner.

Figure 5:
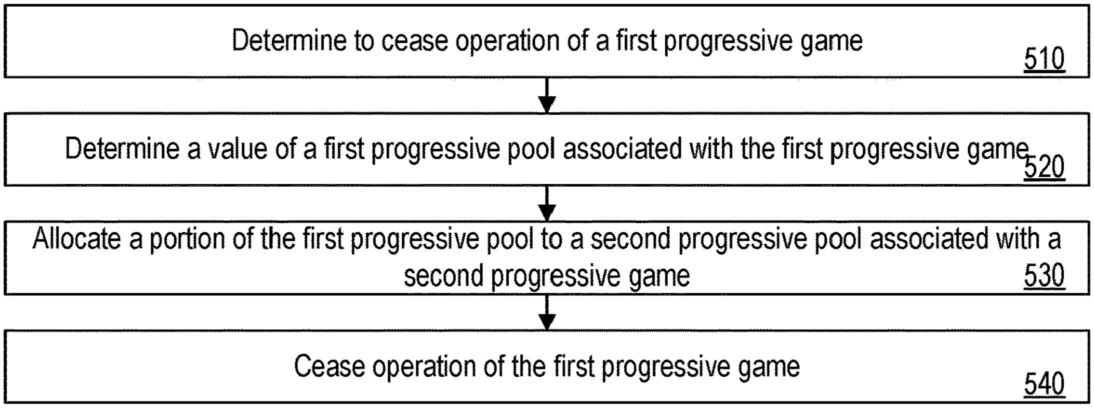

FIG. 5 illustrates an example of operations performed by a system (e.g., system 10) to manage progressive pools. Although described below as being performed by central controller 40 of system 10, any suitable entity can perform one or more of the operations. For example, some or all of the operations can be performed by a progressive controller, host, or EGM.

At block 510, processing circuitry 40 determines to cease operation of a first progressive game. The first progressive game can be associated with a first progressive pool. In some embodiments, determining to cease operation of the first progressive game includes determining to allocate the first progressive pool to a second progressive pool associated with the second progressive game based on an estimated popularity of the first progressive game and/or an estimated popularity of the second progressive game. In some examples, using machine learning, a system may determine that reallocating some or all of the first progressive pool from to the second progressive pool may increase revenue for an operator.

At block 520, processing circuitry 40 determines a value of a first progressive pool associated with the first progressive game. In some embodiments, the EGM 100 communicates with a first EGM providing the progressive game to determine a value of the first progressive pool.

At block 530, processing circuitry 40 allocates a portion of the first progressive pool to a second progressive pool associated with a second progressive game. In some embodiments, allocating the first progressive pool includes electronically transferring the first progressive pool to a second accounts associated with the second progressive pool.

At block 540, processing circuitry 40 ceases operation of the first progressive game. In some embodiments ceasing operation of the first progressive game includes transmitting a message to an EGM, the message including instructions to cease operation of the first progressive game.

Figure 6:
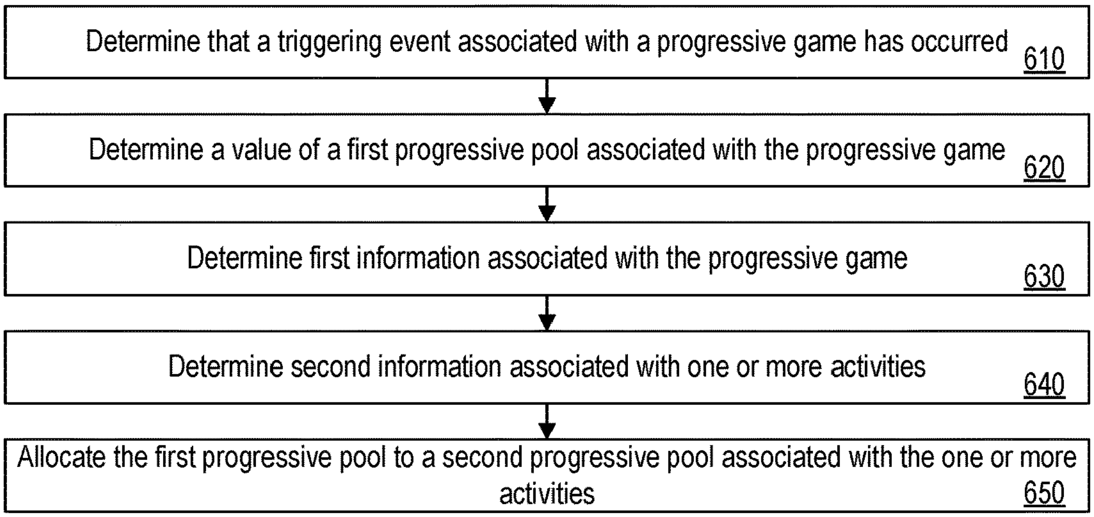
Figure 7:
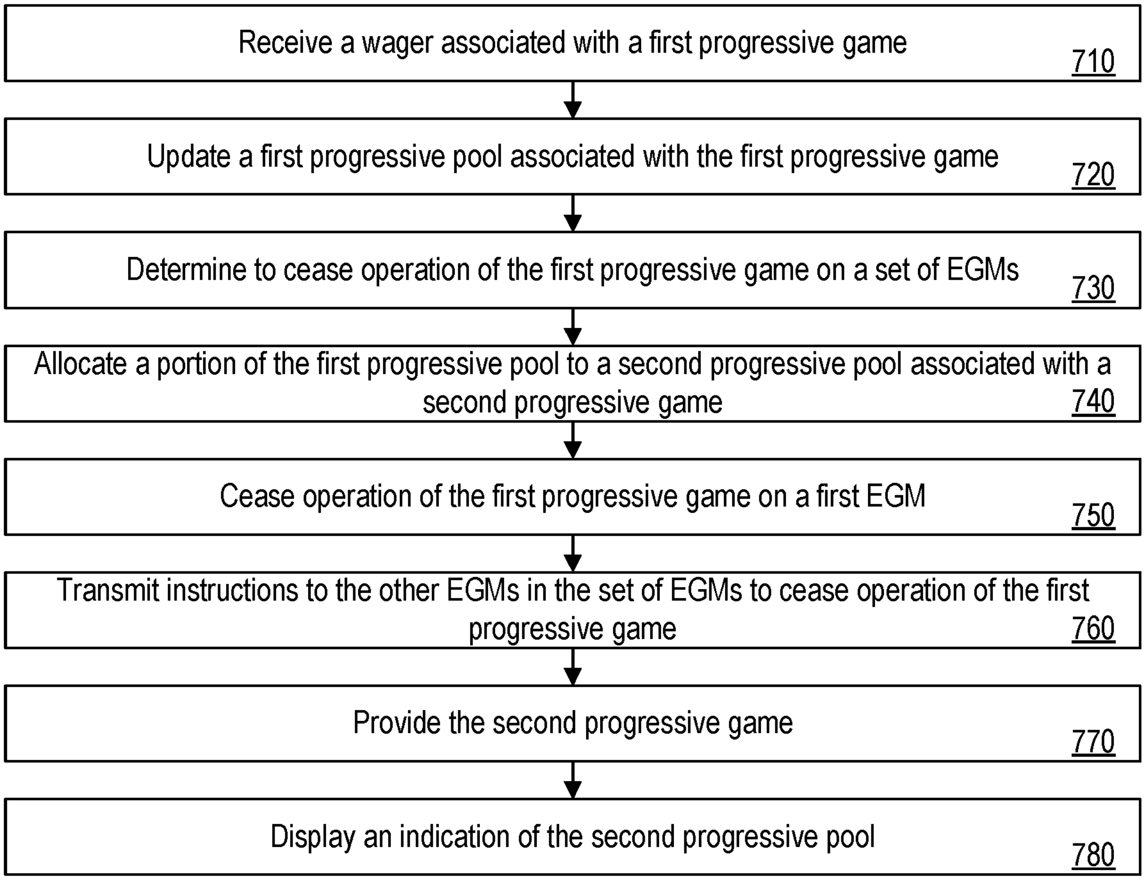

FIGS. 6-7 illustrate additional examples of operations for managing a progressive pool. Although FIGS. 6-7 are described below as being performed by EGM 100, the operations may be performed by any suitable entity (e.g., system 10 or progressive controller 40)

FIG. 6 illustrates an example of operations performed by a device (described below as EGM 100) for managing a progressive pool associated with a progressive game provided by one or more EGMs.

At block 610, processing circuitry 12 determines a triggering event associated with a progressive game has occurred. In some embodiments, determining that the triggering event has occurred includes receiving a request to stop operation of the progressive game. In additional or alternative embodiments, determining that the triggering event has occurred includes determining, using machine learning, to allocate a first progressive pool associated with the progressive game to a second progressive pool associated with the one or more activities based on a number of players playing the progressive game and/or a number of players participating in the one or more activities. In some examples, using machine learning, a system may determine that reallocating some or all of the first progressive pool to a second progressive pool may increase revenue for an operator. In additional or alternative examples, a system may notice that players are playing a progressive game regardless of the size of its progressive pool and may reallocate some or all of a progressive pool associated with the progressive game to encourage players to play other progressive games and/or to reduce the amount the operator will have to payout if someone playing the popular progressive game wins.

At block 620, processing circuitry 12 determines a value of a first progressive pool associated with the progressive game. In some embodiments, determining the value of the first progressive pool includes electronically transferring the first progressive pool to a first account. In additional or alternative embodiments, the EGM communicates with another EGM, a progressive controller, or a host to determine a value of the first progressive pool.

In additional or alternative embodiments, determining the value of the first progressive pool includes determining the value of the first progressive pool without requiring any of the one or more EGMs to cease operation. In some examples, legacy progressive games require a technician to interact with individual EGMs to log updates to the first progressive pool. Some embodiments herein allow the value of the first progressive pool to be updated, logged, and maintained electronically and in real-time.

In additional or alternative embodiments, determining the value of the first progressive pool includes determining the value of the first progressive pool in response to determining that the triggering event has occurred. In some examples, limiting the number of times a system and/or entity has to communicate with devices (e.g., EGMs and progressive controllers) to only after a triggering event has occurred can reduce the amount of signaling required to determine the value of the first progressive pool and reduce the bandwidth required between the devices.

At block 630, processing circuitry 12 determines first information associated with progressive game. In some embodiments, the first information includes an indication of a probability of winning the first progressive pool by playing the progressive game and an indication of an amount that must be wagered to play the progressive game.

At block 640, processing circuitry 12 determines second information associated with one or more activities. In some embodiments the progressive game is a first progressive game and the one or more actions include a second progressive game. In additional or alternative embodiments, the one or more activities include a giveaway.

In additional or alternative embodiments, the second information includes an indication of a probability of winning a second progressive award by participating in each of the one or more activities and an indication of an amount that must be wagered to participate in each of the one or more activities.

At block 650, processing circuitry 12 allocates the first progressive pool to the second progressive pool associated with the one or more activities. In some embodiments, allocating the first progressive pool includes electronically transferring the first progressive pool to one or more second accounts associated with the second progressive pool. In additional or alternative embodiments, allocating the first progressive pool includes electronically transferring the first progressive pool to one or more progressive controllers associated with the EGMs providing the second progressive game.

In additional or alternative embodiments, allocating the first progressive pool includes determining that an amount of time has elapsed since transferring the first progressive pool to the first account. In some examples, the amount of time is based on regulatory rules. Responsive to determining that the amount of time has elapsed, processing circuitry 12 can reallocate the first progressive pool to the first progressive pool associated with the progressive game.

In additional or alternative embodiments, allocating the first progressive pool includes allocating the first progressive pool to the second progressive pool based on input from an operator.

In additional or alternative embodiments, allocating the first progressive pool includes allocating the first progressive pool without requiring any of the one or more EGMs to cease operation.

In additional or alternative embodiments, allocating the first progressive pool includes allocating the first progressive pool to the second progressive pool associated with the one or more activities based on the first information, second information, and predetermined regulatory rules.

FIG. 7 illustrates an example of operations performed by a device (described below as EGM 100) for managing a first progressive pool associated with a progressive game provided by one or more EGMs.

At block 710, processing circuitry 12 receives, via communication adapter 26, a wager associated with a first progressive game.

At block 720, processing circuitry 12 updates the first progressive pool associated with the first progressive game. In some embodiments, a value of the first progressive pool is determined without requiring any EGM of the set of EGMs to cease operation.

At block 730, processing circuitry 12 determines to cease operation of the first progressive game on a set of EGMs.

At block 740, processing circuitry 12 allocates a portion of the first progressive pool to a second progressive pool associated with a second progressive game. In some embodiments, a regulator rule requires that the second progressive game share some characteristics with the first progressive game. In some examples, the characteristics include a probability of winning and an availability to players. The portion of the first progressive pool can be allocated to the second progressive pool in response to the first progressive game and the second progressive game sharing one or more characteristics.

In additional or alternative embodiments, allocating the portion of the first progressive pool includes allocating the portion of the first progressive pool without requiring any EGM of the set of EGMs to cease operation.

At block 750, processing circuitry 12 ceases operation of the first progressive game on a first EGM.

At block 760, processing circuitry 12 transmits, via communication adapter 26, instructions to the other EGMs in the set of EGMs to cease operation of the first progressive game.

At block 770, processing circuitry 12 provides the second progressive game.

At block 780, processing circuitry 12 displays, via display device 116, an indication of the second progressive pool.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C #, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks. The flowchart and block diagrams in the FIGS. illustrate the architecture, functionality, and operation of possible implementations of systems, methods, and computer program products according to various aspects of the present disclosure. In this regard, each block in the flowchart or block diagrams may represent a module, segment, or portion of code, which includes one or more executable instructions for implementing the specified logical function(s). It should also be noted that, in some implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be designated as "/". Like reference numbers signify like elements throughout the description of the figures.

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

What is claimed is:

1. A system configured to manage progressive pools, the system comprising:

a processor circuit; and a memory coupled to the processor circuit, the memory comprising machine-readable instructions that, when executed by the processor circuit, cause the system to perform operations comprising:

determining to cease operation of a first progressive game on a first electronic gaming machines ("EGM"), the first progressive game being associated with a first progressive pool;

responsive to determining to cease operation of the first progressive game, allocating a portion of the first progressive pool to a second progressive pool associated with a second progressive game based on a characteristic of the first progressive game and a characteristic of the second progressive game; and responsive to determining to cease operation of the first progressive game, transmitting a message to the first EGM, the message comprising instructions to cease operation of the first progressive game.

2. The system of claim 1, wherein determining to cease operation of the first progressive game comprises determining to allocate the portion of the first progressive pool to the second progressive pool based on an estimated popularity of the first progressive game and/or an estimated popularity of the second progressive game.

3. The system of claim 1, wherein allocating the portion of the first progressive pool comprises:

electronically transferring the portion of the first progressive pool to a second account associated with the second progressive game.

4. The system of claim 1, the operations further comprising:

responsive to determining to cease operation of the first progressive game, communicating with the first EGM or a progressive controller associated with the first progressive pool to determine a value of the portion of the first progressive pool.

5. A method performed by a device of managing a first progressive pool associated with a progressive game provided by one or more electronic gaming machines ("EGMs"), the method comprising:

determining a triggering event associated with the progressive game has occurred;

determining a value of a portion of the first progressive pool; and allocating the portion of the first progressive pool to a second progressive pool associated with one or more activities that are separate from the progressive game.

6. The method of claim 5, wherein determining that the triggering event has occurred comprises receiving a request to stop operation of the progressive game.

7. The method of claim 5, wherein determining that the triggering event has occurred comprises determining, using machine learning, to allocate the portion of the first progressive pool to the second progressive pool based on a number of players playing the progressive game and/or a number of players participating in the one or more activities.

8. The method of claim 5, wherein determining the value of the portion of the first progressive pool comprises electronically transferring the first progressive pool to a first account, and wherein allocating the first progressive pool comprises electronically transferring the portion of the first progressive pool to a second account associated with the second progressive pool.

9. The method of claim 8, wherein allocating the portion of the first progressive pool further comprises:

determining that an amount of time has elapsed since transferring the portion of the first progressive pool to the first account, the amount of time being based on regulatory rules; and responsive to determining that the amount of time has elapsed, transferring the value of the portion of the first progressive pool to the first progressive pool associated with the progressive game.

10. The method of claim 5, wherein the progressive game comprises a first progressive game, and wherein the one or more activities comprise a second progressive game.

11. The method of claim 5, wherein allocating the portion of the first progressive pool comprises allocating the portion of the first progressive pool to the second progressive pool based on input from an operator.

12. The method of claim 5, wherein determining the value of the portion of the first progressive pool comprises determining the value of the portion of the first progressive pool without requiring any of the one or more EGMs to cease operation, and wherein allocating the portion of the first progressive pool comprises allocating the portion of the first progressive pool without requiring any of the one or more EGMs to cease operation.

13. The method of claim 5, further comprising:

determining first information associated with the progressive game; and determining second information associated with the one or more activities, wherein allocating the portion of the first progressive pool comprises allocating the portion of the first progressive pool to the second progressive pool based on the first information, second information, and predetermined regulatory rules.

14. The method of claim 13, wherein the first information comprises:

an indication of a probability of winning the first progressive pool by playing the progressive game; and an indication of an amount that must be wagered to play the progressive game, and wherein the second information comprises:

an indication of a probability of winning a progressive award by participating in each of the one or more activities; and an indication of an amount that must be wagered to participate in each of the one or more activities.

15. The method of claim 5, wherein determining the value of the portion of the first progressive pool comprises responsive to determining that the triggering event has occurred, determining the value of the portion of the first progressive pool.

16. A device configured to manage progressive pools, the device comprising:

a processor circuit; and a memory coupled to the processor circuit, the memory comprising machine-readable instructions that, when executed by the processor circuit, cause the device to perform operations comprising:

determining to cease operation of a first progressive game on a set of electronic gaming machines ("EGMs"), the first progressive game being associated with a first progressive pool; and responsive to determining to cease operation of the first progressive game, allocating a portion of the first progressive pool to a second progressive pool associated with a second progressive game based on a characteristic of the first progressive game and a characteristic of the second progressive game.

17. The device of claim 16, wherein the device comprises a first EGM of the set of EGMs, the operations further comprising:

responsive to determining to cease operation of the first progressive game, ceasing operation of the first progressive game on the first EGM; and responsive to determining to cease operation of the first progressive game, transmitting instructions to the other EGMs in the set of EGMs to cease operation of the first progressive game.

18. The device of claim 16, wherein the device comprises a first EGM of the set of EGMs, the operations further comprising:

receiving a wager associated with the first progressive game; and responsive to receiving the wager, updating the first progressive pool associated with the first progressive game.

19. The device of claim 16, wherein the device comprises an EGM, the operations further comprising:

responsive to allocating the portion of the first progressive pool to the second progressive pool, providing the second progressive game on the EGM; and displaying, via a display device, an indication of the second progressive pool based on the portion of the first progressive pool.

20. The device of claim 16, the operations further comprising:

determining a value of the portion of the first progressive pool without requiring any EGM of the set of EGMs to cease operation, wherein allocating the portion of the first progressive pool comprises allocating the portion of the first progressive pool without requiring any EGM of the set of EGMs to cease operation.

* * * * *